United States Patent
Wu et al.

(10) Patent No.: US 8,483,194 B1
(45) Date of Patent: Jul. 9, 2013

(54) AIRTIME-BASED SCHEDULING

(75) Inventors: Peter Wu, Saratoga, CA (US);
Sreekanth Reddy, San Jose, CA (US);
Jianlin Zeng, San Jose, CA (US);
Changming Liu, Cupertino, CA (US)

(73) Assignee: Aerohive Networks, Inc., Sunnyvale, CA (US)

( * ) Notice: Subject to any disclaimer, the term of this patent is extended or adjusted under 35 U.S.C. 154(b) by 0 days.

(21) Appl. No.: 12/356,886

(22) Filed: Jan. 21, 2009

(51) Int. Cl.
*H04W 72/00* (2009.01)

(52) U.S. Cl.
USPC ........... 370/338; 370/328; 370/329; 370/230; 370/395.21

(58) Field of Classification Search
None
See application file for complete search history.

(56) References Cited

U.S. PATENT DOCUMENTS

| | | | |
|---|---|---|---|
| 5,471,671 A | 11/1995 | Wang et al. | |
| 5,697,059 A | 12/1997 | Carney | |
| 5,726,984 A | 3/1998 | Kubler et al. | |
| 5,956,643 A | 9/1999 | Benveniste | |
| 6,112,092 A | 8/2000 | Benveniste | |
| 6,154,655 A | 11/2000 | Borst et al. | |
| 6,314,294 B1 | 11/2001 | Benveniste | |
| 6,473,413 B1 | 10/2002 | Chiou et al. | |
| 6,496,699 B2 | 12/2002 | Benveniste | |
| 6,519,461 B1 | 2/2003 | Andersson et al. | |
| 6,628,938 B1 | 9/2003 | Rachabathuni et al. | |
| 6,775,549 B2 | 8/2004 | Benveniste | |
| 6,865,393 B1 | 3/2005 | Baum et al. | |
| 7,057,566 B2 | 6/2006 | Theobold | |
| 7,085,224 B1 | 8/2006 | Oran | |
| 7,085,241 B1 | 8/2006 | O'Neill et al. | |
| 7,164,667 B2 | 1/2007 | Rayment et al. | |
| 7,174,170 B2 | 2/2007 | Steer et al. | |
| 7,177,646 B2 | 2/2007 | Corson et al. | |
| 7,181,530 B1 | 2/2007 | Halasz et al. | |
| 7,224,697 B2 | 5/2007 | Banerjea et al. | |
| 7,251,238 B2 | 7/2007 | Joshi et al. | |
| 7,512,379 B2 | 3/2009 | Nguyen | |
| 7,706,789 B2 | 4/2010 | Qi et al. | |
| 7,716,370 B1 | 5/2010 | Devarapalli | |
| 7,793,104 B2 | 9/2010 | Zheng et al. | |
| 7,843,832 B2 * | 11/2010 | Choi et al. | 370/235.1 |
| 7,843,907 B1 | 11/2010 | Abou-Emara et al. | |

(Continued)

OTHER PUBLICATIONS

Clausen, T., et al., Optimized Link State Routing Protocol (OLSR), Network Working Group, Oct. 2003, pp. 1-71.

(Continued)

*Primary Examiner* — Huy D Vu
*Assistant Examiner* — Zewdu A Beyen
(74) *Attorney, Agent, or Firm* — Sheppard, Mullin, Richter & Hampton LLP

(57) ABSTRACT

Airtime usage may be used as a factor in controlling network traffic flow to and from client devices via a wireless network interface. Received packets or other data are assigned to a quality of service profile. Additionally, a cost value for communicating the received data is determined at least in part based on an actual or estimated airtime usage for the received packet. The cost value is used to allocate wireless network airtime to data. The allocation of wireless network airtime may be varied dynamically based on operating conditions. The cost value may be based on factors including the airtime used to communicate data; whether the data is a retransmission; and wireless network overhead. The cost value of data may also be different depending on whether the data is being sent from a client device or to a client device.

17 Claims, 2 Drawing Sheets

U.S. PATENT DOCUMENTS

| | | | |
|---|---|---|---|
| 7,844,057 | B2 | 11/2010 | Meier et al. |
| 8,219,688 | B2 | 7/2012 | Wang |
| 8,249,606 | B1 | 8/2012 | Neophytou et al. |
| 2002/0021689 | A1 | 2/2002 | Robbins et al. |
| 2002/0071422 | A1 | 6/2002 | Amicangioli |
| 2002/0091813 | A1 | 7/2002 | Lamberton et al. |
| 2002/0116463 | A1 | 8/2002 | Hart |
| 2003/0104814 | A1 | 6/2003 | Gwon et al. |
| 2003/0129988 | A1* | 7/2003 | Lee et al. ............. 455/450 |
| 2003/0145091 | A1 | 7/2003 | Peng et al. |
| 2003/0179742 | A1 | 9/2003 | Ogier et al. |
| 2004/0013118 | A1 | 1/2004 | Borella |
| 2004/0022222 | A1 | 2/2004 | Clisham |
| 2004/0103282 | A1 | 5/2004 | Meier et al. |
| 2004/0109466 | A1 | 6/2004 | Van Ackere et al. |
| 2004/0162037 | A1 | 8/2004 | Shpak |
| 2004/0192312 | A1* | 9/2004 | Li et al. ............. 455/445 |
| 2004/0236939 | A1 | 11/2004 | Watanabe et al. |
| 2004/0255028 | A1 | 12/2004 | Chu et al. |
| 2005/0053003 | A1 | 3/2005 | Cain et al. |
| 2005/0074015 | A1 | 4/2005 | Chari et al. |
| 2005/0099983 | A1 | 5/2005 | Nakamura et al. |
| 2005/0122946 | A1 | 6/2005 | Won |
| 2005/0207417 | A1 | 9/2005 | Ogawa et al. |
| 2005/0262266 | A1 | 11/2005 | Wiberg et al. |
| 2005/0266848 | A1 | 12/2005 | Kim |
| 2006/0062250 | A1* | 3/2006 | Payne ............. 370/468 |
| 2006/0107050 | A1 | 5/2006 | Shih |
| 2006/0117018 | A1 | 6/2006 | Christiansen et al. |
| 2006/0140123 | A1 | 6/2006 | Conner et al. |
| 2006/0146748 | A1 | 7/2006 | Ng et al. |
| 2006/0146846 | A1 | 7/2006 | Yarvis et al. |
| 2006/0187949 | A1 | 8/2006 | Seshan et al. |
| 2006/0221920 | A1 | 10/2006 | Gopalakrishnan et al. |
| 2006/0233128 | A1 | 10/2006 | Sood et al. |
| 2006/0234701 | A1 | 10/2006 | Wang et al. |
| 2006/0245442 | A1 | 11/2006 | Srikrishna et al. |
| 2006/0268802 | A1 | 11/2006 | Faccin |
| 2006/0294246 | A1 | 12/2006 | Stieglitz et al. |
| 2007/0010231 | A1 | 1/2007 | Du |
| 2007/0025274 | A1 | 2/2007 | Rahman et al. |
| 2007/0078663 | A1 | 4/2007 | Grace |
| 2007/0082656 | A1 | 4/2007 | Stieglitz et al. |
| 2007/0091859 | A1 | 4/2007 | Sethi et al. |
| 2007/0116011 | A1 | 5/2007 | Lim et al. |
| 2007/0121947 | A1 | 5/2007 | Sood et al. |
| 2007/0133407 | A1* | 6/2007 | Choi et al. ............. 370/230 |
| 2007/0140191 | A1 | 6/2007 | Kojima |
| 2007/0249324 | A1 | 10/2007 | Jou et al. |
| 2007/0263532 | A1 | 11/2007 | Mirtorabi et al. |
| 2007/0280481 | A1 | 12/2007 | Eastlake et al. |
| 2007/0288997 | A1 | 12/2007 | Meier et al. |
| 2008/0002642 | A1 | 1/2008 | Borkar et al. |
| 2008/0080369 | A1* | 4/2008 | Sumioka et al. ............. 370/229 |
| 2008/0080377 | A1 | 4/2008 | Sasaki et al. |
| 2008/0090575 | A1 | 4/2008 | Barak et al. |
| 2008/0095094 | A1 | 4/2008 | Innami |
| 2008/0130495 | A1 | 6/2008 | Dos Remedios et al. |
| 2008/0146240 | A1 | 6/2008 | Trudeau |
| 2008/0170527 | A1 | 7/2008 | Lundsgaard et al. |
| 2008/0207215 | A1 | 8/2008 | Chu et al. |
| 2008/0225857 | A1 | 9/2008 | Lange |
| 2008/0229095 | A1 | 9/2008 | Kalimuthu et al. |
| 2008/0273520 | A1 | 11/2008 | Kim et al. |
| 2009/0028052 | A1 | 1/2009 | Strater et al. |
| 2009/0082025 | A1 | 3/2009 | Song |
| 2009/0088152 | A1 | 4/2009 | Orlassino |
| 2009/0097436 | A1 | 4/2009 | Vasudevan et al. |
| 2009/0111468 | A1 | 4/2009 | Burgess et al. |
| 2009/0144740 | A1* | 6/2009 | Gao ............. 718/103 |
| 2009/0168645 | A1 | 7/2009 | Tester et al. |
| 2009/0239531 | A1 | 9/2009 | Andreasen et al. |
| 2009/0240789 | A1 | 9/2009 | Dandabany |
| 2009/0247170 | A1 | 10/2009 | Balasubramanian et al. |
| 2010/0057930 | A1 | 3/2010 | DeHaan |
| 2010/0115576 | A1 | 5/2010 | Hale et al. |
| 2010/0208614 | A1* | 8/2010 | Harmatos ............. 370/253 |
| 2010/0228843 | A1 | 9/2010 | Ok et al. |
| 2010/0254316 | A1* | 10/2010 | Sendrowicz ............. 370/328 |
| 2010/0260091 | A1 | 10/2010 | Seok |
| 2010/0304738 | A1 | 12/2010 | Lim |
| 2010/0311420 | A1 | 12/2010 | Reza et al. |
| 2010/0322217 | A1 | 12/2010 | Jin et al. |
| 2011/0004913 | A1 | 1/2011 | Nagarajan et al. |
| 2011/0055326 | A1 | 3/2011 | Michaelis et al. |
| 2011/0064065 | A1* | 3/2011 | Nakajima et al. ............. 370/338 |
| 2011/0182225 | A1 | 7/2011 | Song et al. |
| 2011/0185231 | A1 | 7/2011 | Balestrieri et al. |
| 2012/0014386 | A1 | 1/2012 | Xiong et al. |
| 2012/0290650 | A1 | 11/2012 | Montuno et al. |
| 2013/0028158 | A1 | 1/2013 | Lee et al. |

OTHER PUBLICATIONS

Perkins, C., et al., Ad hoc On-Demand Distance Vector (AODV) Routing, Network Working Group, Oct. 2003, pp. 1-35.
International Application No. PCT/US2011/047591, International Search Report and Written Opinion mailed Dec. 19, 2011.
International Application No. PCT/US2008/061674, International Search Report and Written Opinion mailed Oct. 14, 2008.
International Application No. PCT/US2012/059093, International Search Report and Written Opinion mailed Jan. 4, 2013.

* cited by examiner

AIRTIME-BASED SCHEDULING

BACKGROUND

This application is related to the field of wireless networking devices, and in particular to systems and methods for controlling network traffic to and from clients. Networking devices enable data communications between two or more devices, referred to generally as clients. Data communications may be conducted over wired and/or wireless network interfaces. Typically, data is partitioned into packets, which are then communicated via one or more networking devices to one or more destination clients.

Networking devices may handle packets generated by and directed to large numbers of clients over the same interface. The bandwidth or data communications capacity of networking devices limits the amount of data or the rate of network packets passing through network devices. The limits on bandwidth are particularly acute in network devices including wireless network interfaces. If the bandwidth limit of a networking device is reached or exceeded by its clients network traffic, packets may be delayed or dropped. Depending on the type of data being communicated over the network, these traffic disruptions caused by reaching or exceeding bandwidth limit of a networking device may adversely affect the performance of applications on a client. For example, clients receiving voice or streaming video data may be adversely affected by even small delays or losses of packets.

Because of the limits on network device bandwidth, many network devices include quality of service (QoS) functionality. Quality of service functionality allows network administrators to provide different priority for packets or other network data based on factors such as the associated client, user, client application, or data flow. Typically, users, clients, or applications are assigned to different quality of service profiles. Each quality of service profile specifies a quality of service parameters to associated packets or other network data. Networking devices use the scheduling weights to prioritize packet traffic and potentially guarantee a minimum level of performance to some or all of the network data flows.

However, typical quality of service functionality does not take into consideration performance issues unique to wireless network interfaces. For example, many wireless network interfaces support multiple wireless networking standards, such as IEEE 802.11a, 802.11b, 802.11g, and 802.11n. This allows the networking device to support legacy clients using slower (e.g. relatively low data-rate) standards, such as 802.11b, as well as newer clients capable of communicating via faster (e.g. relatively high data-rate) standards, such as 802.11n. When a networking device is operating in a mixed mode and communicating with clients via multiple standards, the clients using slower data rates, such as clients using older standards or newer standards at lower data rates, for example due to lower signal strength or radio interference, will consume a disproportionate amount of airtime from the wireless network interface. As a result of this disproportionate airtime usage, the performance of other clients attempting to utilize faster data rates will be degraded substantially.

SUMMARY

An embodiment of the invention includes airtime usage as a factor in controlling network traffic flow to and from client devices via a wireless network interface. In an embodiment, packets or other data received via a wired or wireless network interface and directed to a client device or received from a client via a wireless network interface are assigned to a quality of service profile. Additionally, a cost value for communicating the packet or other data is determined at least in part based on an actual or estimated airtime usage for the packet to be communicated to or from the client via a wireless network interface. The cost value is used to allocate wireless network airtime to clients. In a further embodiment, the consumption of wireless network airtime may be varied dynamically based on operating conditions.

In an embodiment, the cost value may be based on factors including the actual or estimated airtime used to communicate the packet via the wireless network interface; whether the packet or other data is a retransmission of a previous packet or other data; and actual or estimated wireless network overhead. The cost value of a packet may also be different depending on whether the packet is being sent from a client device or to a client device.

In an embodiment, a token bucket scheduling system is used to allocate wireless network bandwidth based on received packets' cost values and token balances associated with quality of service profiles. In a further embodiment, packets or other data received from a client device via a wireless network interface may be dropped or discarded if a queue associated with a quality of service is full

BRIEF DESCRIPTION OF THE DRAWINGS

The invention will be described with reference to the drawings, in which.

DETAILED DESCRIPTION

Figure 1:
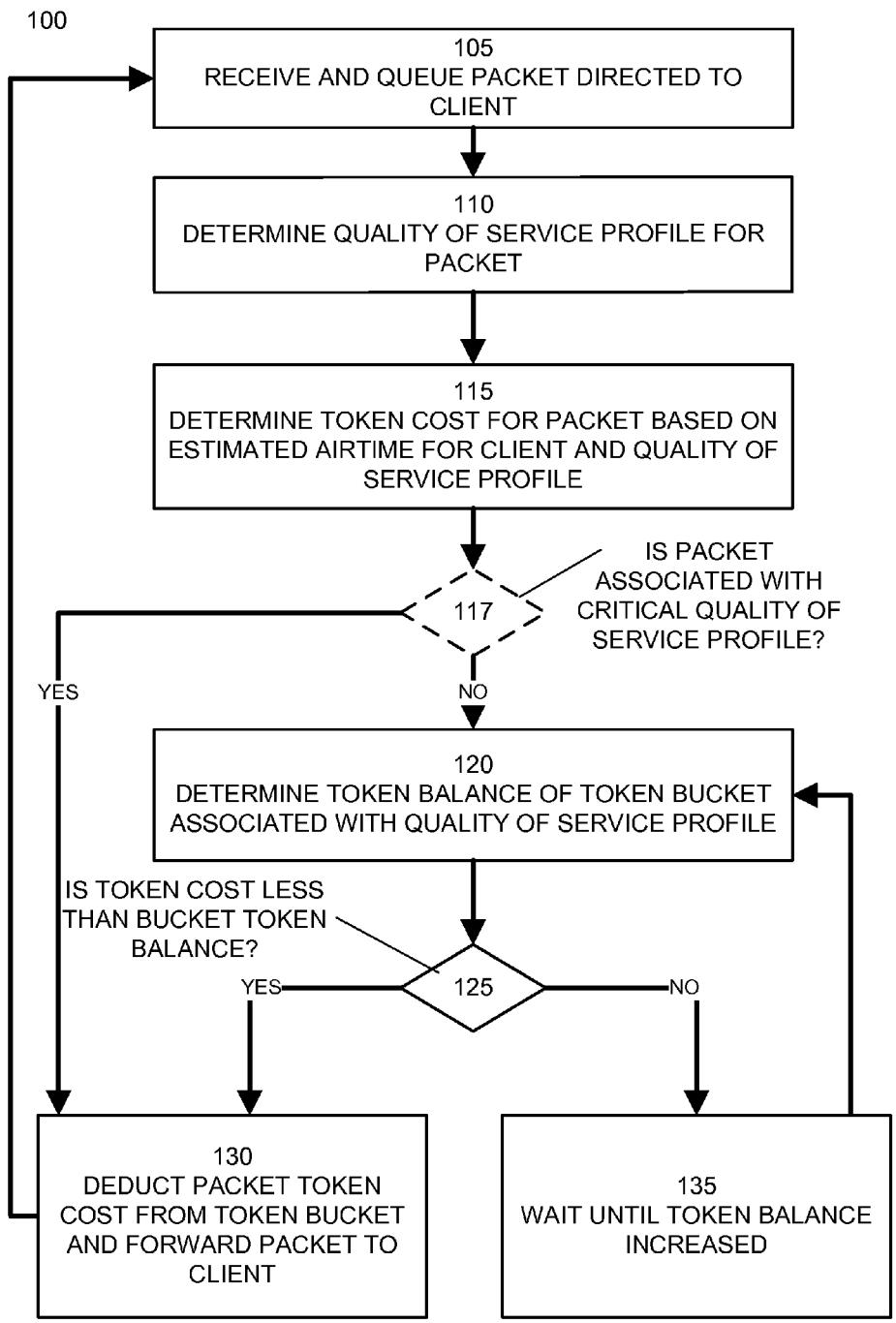
FIG. 1 illustrates a method of scheduling downlink network traffic according to an embodiment of the invention.

FIG. 1 illustrates a method 100 of scheduling downlink network traffic according to an embodiment of the invention. In this application, downlink network traffic refers to network traffic received by a network device via a wired or wireless network connection and directed to a client device via a wireless network connection. In step 105, a packet or other type of network data is received by a network device. In an embodiment, the packet is directed to a client device in direct or indirect communication with the network device via a wireless network connection. For example, the network device may be adapted to communicate the packet directly to the client device via a wireless network connection or to one or more additional network devices via the wireless network connection, which in turn communicate the packet to the client device via a wired or wireless network connection.

Step 110 determines a quality of service profile to be associated with the received packet. Embodiments of step 110 may assign a quality of service profile to packets based on the packet source, the packet destination, a user identity or user class associated with the packet source and/or packet destination, the contents or control data associated with a packet, a source or client application associated with a packet, and/or a data flow associated with the packet. The set of quality of service profiles may be specified by network administrators. As described in detail below, each quality of service profile is assigned a scheduling weight and a scheduling mode used to prioritize packets. In further embodiments, a quality of service profile may include a per-user rate limit.

Step 115 determines a token cost for the received packet based on factors including an estimated airtime for the packet and the quality of service profile. In an embodiment, packets are assigned a cost value, referred to as a token cost. The token cost represents the relative amount of network performance consumed by communicating the associated packet towards the intended destination by the network device.

Embodiments of step 115 take into account at least an estimated packet airtime to determine the token cost of the received packet. In an embodiment, step 115 estimates the airtime to communicate the received packet from the network device to the client based on the airtime required by previous packets to the same client, similar clients, and/or clients assigned to the same quality of service profile. For example, a running average of the airtime consumed by one or more of the most-recently sent packets to the same client may be used to determine at least a portion of the estimated packet airtime for the currently received packet.

In a further embodiment, the average airtime of recently sent packets is weighted or divided by their respective packet sizes to determine an average airtime consumed per data unit, such as average airtime consumed per byte. This average airtime consumed per data unit may then be scaled or weighted according the size of the received packet to determine at least a portion of the estimated airtime for the currently received packet. This enables the token cost of a packet to increase with the packet size, as larger packets consume more network bandwidth.

In addition to estimating the airtime consumed in transmitting the packet, an embodiment of step 115 may also include other factors in determining the token cost of a packet. The token cost or total estimated airtime may include an estimated airtime for transmitting a packet to the client, the actual, estimated, or prorated airtime used for retransmitting packets that were previously unsuccessfully transmitted, and/or some or all of the network overhead.

Optional decision block 117 may determine if the packet is associated with a critical quality of service profile. In an embodiment, users, user groups, and/or the types of applications associated with a packet may be assigned to a critical quality of service profile if any delay in forwarding the packet is unacceptable. For example, packets from voice-over IP (VOIP) and live video applications may be assigned to a critical quality of service profile. If a packet is associated with a critical quality of service profile, method 100 proceeds directly from decision block 117 to step 130 to forward the packet to its destination. However, as described in detail below, step 130 may deduct the token cost of this critical packet from a token bucket associated with the application, user group, or individual user. This has the effect of potentially limiting the airtime of any future non-critical packets from the same application, user group, or user.

Step 120 determines a token balance of a token bucket associated with the selected quality of service profile. In an embodiment, each quality of service profile is associated with its own token bucket. A token bucket is a data structure including a token balance value. The token balance value represents the unused proportion of the network bandwidth assigned to a quality of service profile. Token costs and token balance values may be expressed in arbitrary units.

In an embodiment, the token balance value of each token bucket is periodically increased or incremented, representing additional network bandwidth allocated to the associated quality of service profile for a period of time. In an embodiment, a scheduling weight associated with a quality of service profile is used to determine the rate or amount by which the token balance value of the token bucket is increased. For example, the token balance value of a token bucket associated with a higher priority quality of service profile may be incremented more frequently and/or by larger amounts. This has the effect of allocating more network bandwidth to packets associated with the high priority quality of service profile. In an alternate embodiment, each token bucket has its token balance value incremented by the same amount and at the same frequency.

In further embodiments, the range of the token balance value of each token bucket may be limited between a maximum token balance value and/or a minimum token balance value. The token increment value, token balance incrementing rate, and the minimum and maximum token balance limits of each token bucket may be specified based on the associated quality of service profile and optionally one or more other quality of service profiles. In a further embodiment, the token increment value, token balance incrementing rate, the minimum and maximum token balance limits of each token bucket, or any other factor affecting the allocation of wireless networking airtime may be dynamically specified based on the performance of the wireless network interface.

Decision block 125 compares the token cost of the received packet with the token balance value of the associated token bucket. If the token cost of the received packet is less than the token balance of the token bucket corresponding with the assigned quality of service profile, then method 100 proceeds to step 130.

Step 130 deducts the token cost from the token balance of the associated token bucket and forwards the packet to the client via the wireless network interface. By deducting the token cost from the token balance of the token bucket, the token balance reflects the relative proportion of the wireless network interface's bandwidth that has been used by the assigned quality of service profile. The packet may be communicated to the client device using any wireless networking standard or technique known in the art. In a further embodiment, the network device may communicate with multiple clients using different wireless networking standards or techniques, depending on the client capabilities and/or operating conditions. Following step 130, method 100 optionally proceeds back to step 105 to await the receipt of another packet directed to the same or a different client.

In a further embodiment, step 130 deducts the token cost from the token balance value of the associated token bucket in two phases. First, step 130 deducts the token cost based at least partly on an estimated airtime for the received packet. Step 130 then forwards the packet to the client device via the wireless network interface. Additionally, step 130 monitors the transmission of this packet towards the client to determine its actual airtime usage. Step 130 then uses this actual airtime usage to determine a revised token cost for the received packet. Step 130 then subtracts the difference between the revised token cost and the original token cost of the packet from the token balance value of the token bucket. This adjustment may increase or decrease the token balance value of the token bucket, depending on whether the actual airtime usage of the packet is less than or greater than the estimated airtime, respectively.

Returning to decision block 125, if the token cost of the received packet is greater than the token balance of the token bucket corresponding with the assigned quality of service profile, then method 100 proceeds to step 135. Step 135 queues the received packet associated with this quality of service profile until the token balance of its associated token bucket is increased. Following the increase of the token balance of the token bucket associated with the quality of service profile assigned to the received packet, an embodiment of method 100 proceeds back to step 120. Steps 120, 125, and step 135 may be repeated one or more times until the token cost of the queued packet is less than the token balance of the token bucket. In an embodiment, while a packet is queued in step 135, other packets may be received and processed according to method 100.

Although described with reference to downlink network traffic from a network device to a client device, embodiments of method 100 may also be applied to scheduling uplink network traffic from a client device to a network device via a wireless network interface. In this embodiment, method 100 operates in a similar manner as described above. However, the actual airtime of the received uplink packet is already known, eliminating the need to use an estimated airtime to determine at least part of the token cost.

As described above, a packet may be assigned to a critical quality of service profile if any delay in forwarding the packet is unacceptable. In an embodiment, step 130 deducts the token cost of these packets from the token balance of the associated token bucket, similar to other packets associated with non-critical quality of service profiles. However, because packets assigned to critical quality of service profiles bypass steps 120, 125, and 135, the token balance of a token bucket may become negative due to packets in critical quality of service profiles. In an embodiment, a negative token balance will not block further communications of packets associated with critical quality of service profiles. However, other packets associated with the same token bucket, such as packets for the same user, user group, and/or application, will be queued until the token balance of the token bucket increases. In a further embodiment, a token bucket may have a negative limit. When the token balance reaches the negative limit, packets associated with this token bucket may be dropped.

Although method 100 uses token costs and token buckets for controlling network traffic based at least in part on airtime usage, embodiments of the invention can include airtime usage as a factor controlling network traffic using any other network traffic shaping, bandwidth throttling, rate limiting, or quality of service technique known in the art.

Figure 2:
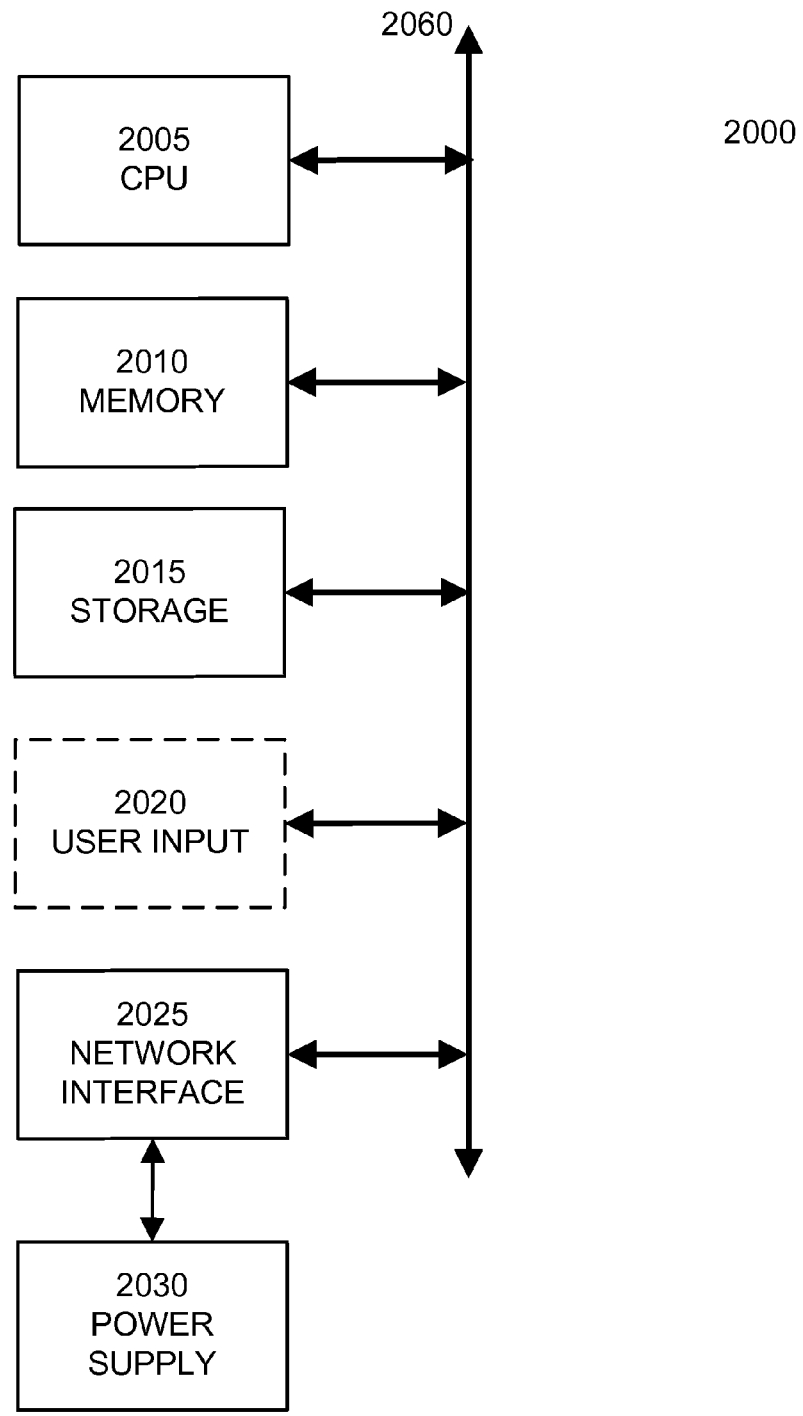
FIG. 2 illustrates an example computer system suitable for implementing an embodiment of the invention.

FIG. 2 illustrates an example computer system suitable for implementing an embodiment of the invention. FIG. 2 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, network traffic optimizers and accelerators, network attached storage devices, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, HD-DVD, or other magnetic, optical, or solid state storage devices.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include a wired networking interface, such as one or more Ethernet connections to communicate with other networking devices via local or wide-area networks. In a further embodiment, computer system 2000 may be capable of receiving some or all of its required electrical power via the network interface 2025, for example using a wired networking interface power over Ethernet system.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

A power supply 2030 provides electrical power to the computer system 2000. Power supply 2030 may be adapted to draw electrical power from a connection with an electrical power distribution grid. In an embodiment, power supply 2030 is connected with network interface 2025 to draw electrical power for computer system 2000 from one or more wired network connections using a network power standard, such as IEEE 802.3af.

Further embodiments can be envisioned to one of ordinary skill in the art after reading the attached documents. For example, embodiments of the invention can be used with any number of network connections and may be added to any type of power supply in addition to the stacked network power supply illustrated above. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for controlling network traffic, the method comprising:
 receiving at a wireless network device a first network packet directed to a first network client;
 assigning the first network packet to a first quality of service category;

determining a first cost value including a numerical value based on an estimated time consumed to communicate the first network packet towards the first network client over a wireless network interface of the wireless network device;

comparing the first cost value with an airtime allocation balance value assigned to the first quality of service category, wherein the airtime allocation balance value represents an unused portion of time for communicating a packet assigned to the first quality of service category over the wireless network interface, and wherein the unused portion of time is associated with the first quality of service category;

in response to the first cost value being less than or equal to the airtime allocation balance value, the wireless network device forwarding the first network packet towards the first network client via at least the wireless network interface and decreasing the airtime allocation balance value by the first cost value, thereby resulting in a modified airtime allocation value;

in response to the first cost value being greater than the airtime allocation balance value, the wireless network device queuing the first network packet until the airtime allocation balance value is increased such that the first cost value is less than or equal to the increased airtime allocation balance value;

in response to the first cost value being less than or equal to the increased airtime allocation balance value, the wireless network device forwarding the first network packet towards the first network client via at least the wireless network interface;

monitoring the communication of the first network packet to the first network client to determine a second cost value including a second numerical value based on an actual airtime consumed to communicate the first network packet towards the first network client over the wireless network interface;

determining an adjustment to the airtime allocation balance value based on a difference between the first and second cost values; and modifying the airtime allocation balance value based on the adjustment.

2. The method of claim 1, wherein queuing the first network packet until the airtime allocation balance value is increased comprises:
increasing the airtime allocation balance value by a value based on a scheduling weight associated with the assigned quality of service profile.

3. The method of claim 1, comprising:
receiving a second network packet directed to the first network client;
assigning the second network packet to the first quality of service category;
determining a second cost value including a second numerical value based on an estimated time consumed to communicate the second network packet towards the first network client over the wireless network interface;
comparing the second cost value with the modified airtime allocation balance value; and in response to the second cost value being less than or equal to the modified airtime allocation balance value, forwarding the second network packet towards the first network client via at least the wireless network interface.

4. The method of claim 3, wherein the first and second network packets are included in a first network connection between the first network client and a first network packet source.

5. The method of claim 1, comprising:
determining if the first network packet is associated with a critical quality of service category; and in response to the first network packet being associated with the critical quality of service category, forwarding the received data towards the first network client regardless of the airtime allocation balance value.

6. The method of claim 5, wherein the modified airtime allocation balance value is less than zero.

7. The method of claim 1, wherein the airtime allocation balance value and the first cost value are included in a token bucket packet scheduler allocating airtime between the first quality of service category and at least one additional quality of service category.

8. The method of claim 1, wherein queuing the first network packet until the airtime allocation balance value is increased comprises periodically incrementing the airtime allocation balance value.

9. The method of claim 1, wherein the first cost value is further based on airtime for communicating the first network packet to the first client device via the wireless network interface.

10. The method of claim 1, wherein the first cost value is further based on airtime for retransmitting data that was previously unsuccessfully transmitted via the wireless network interface.

11. The method of claim 1, wherein the first cost value is further based on airtime for wireless network overhead associated with the wireless network interface.

12. The method of claim 1, wherein the first cost value is further based at least in part on the size of the first network packet.

13. The method of claim 1, wherein the first cost value is further based on measured airtime consumed in forwarding a previous network packet towards the first client device via the wireless network interface.

14. The method of claim 1, wherein the airtime allocation balance value is based on a scheduling weight associated with the first quality of service category.

15. The method of claim 1, wherein the first network packet is received via the wireless network interface.

16. The method of claim 1, wherein the assigned first quality of service category is based on factors selected from a group consisting of:
a received data source; a received data intended destination; a user identity; a user class;
content of the received data; control data; a client application; and a data flow.

17. The method of claim 1, wherein further in response to the first cost value being less than or equal to the airtime allocation balance value:
receiving a second network packet directed to the first network client;
assigning the second network packet to the first quality of service category;
determining a second cost value including a second numerical value based on an estimated time consumed to communicate the second network packet towards the first network client over the wireless network connection;
comparing the second cost value with the modified airtime allocation balance value; and
queuing the second network packet until the modified airtime allocation balance value is increased such that the second cost value is less than or equal to the increased modified airtime allocation balance value.

* * * * *